(No Model.) 2 Sheets—Sheet 1.

F. F. NEITZEL.
WEIGHING APPARATUS FOR THRASHING MACHINES.

No. 270,331. Patented Jan. 9, 1883.

WITNESSES:

INVENTOR
Frank F. Neitzel
BY
ATTORNEY (No Model.) 2 Sheets—Sheet 2.
F. F. NEITZEL.
WEIGHING APPARATUS FOR THRASHING MACHINES.
No. 270,331. Patented Jan. 9, 1883.
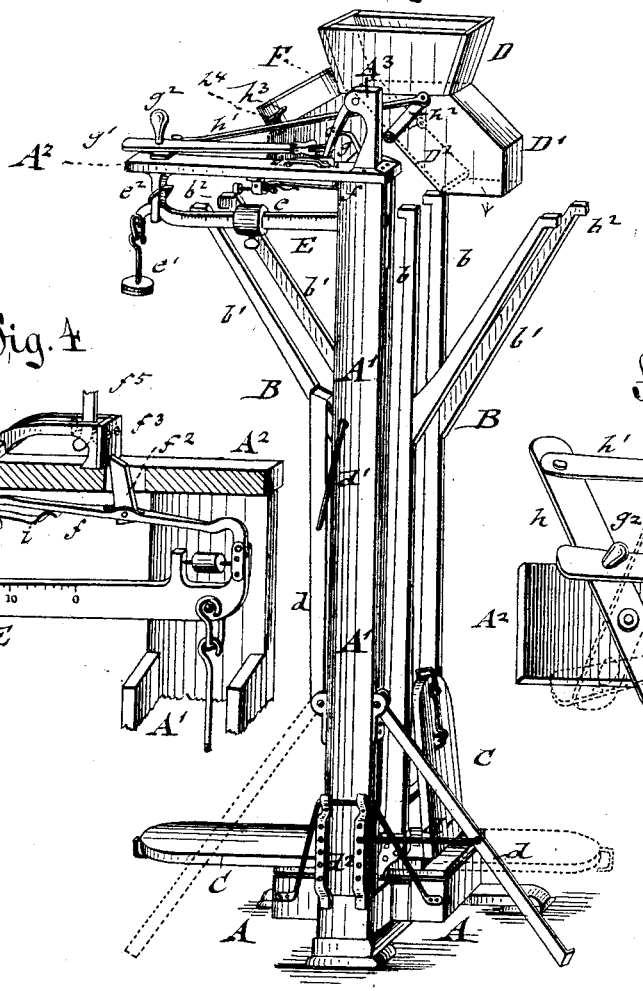
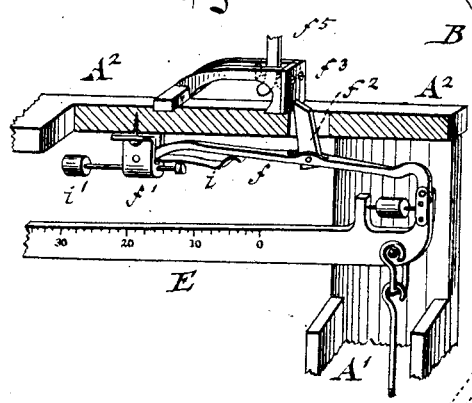
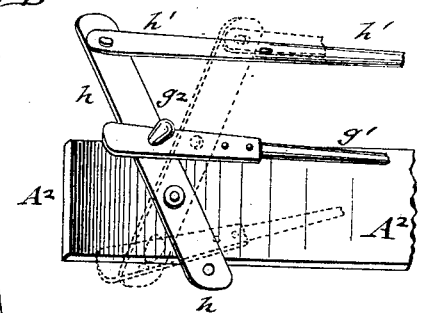
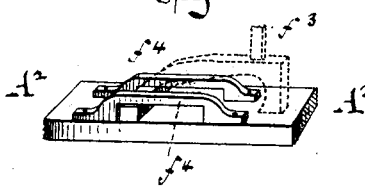
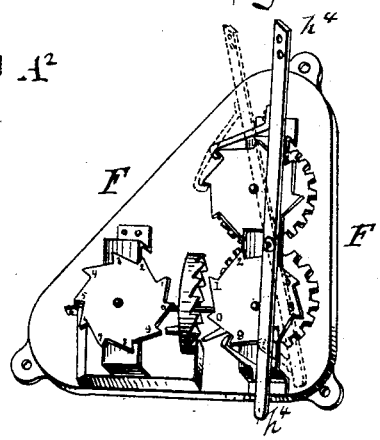
WITNESSES:
INVENTOR
Frank F. Neitzel
BY Paul Goepel
ATTORNEY

UNITED STATES PATENT OFFICE.

FRANK F. NEITZEL, OF WINNEBAGO AGENCY, MINNESOTA.

WEIGHING APPARATUS FOR THRASHING-MACHINES.

SPECIFICATION forming part of Letters Patent No. 270,331, dated January 9, 1883.

Application filed May 24, 1882. (No model.)

*To all whom it may concern:*

Be it known that I, FRANK F. NEITZEL, of Winnebago Agency, Blue Earth county, State of Minnesota, have invented certain new and useful Improvements in Weighing Apparatus for Thrashing-Machines, of which the following is a specification.

The object of this invention is to furnish to owners of thrashing-machines, farmers, and others an improved apparatus by which cleaned and thrashed grain of all kinds can be accurately measured and weighed into bags and the number of bags registered at a considerable saving in time, labor, and grain; and the invention consists of a weighing apparatus in which two bag-holders are arranged in connection with a weighing-scale of any approved construction. The oscillating valve of a hopper which conveys the grain to the bags operates a suitable registering device, said valve being actuated by means of a spring which is released whenever either one of the bags is filled to the proper weight by a stop-lever mechanism connected to the scale-beam. The discharge-valve of the hopper and the register are actuated by the same motion-transmitting lever mechanism and spring-power whenever a bag is filled.

Figure 1:
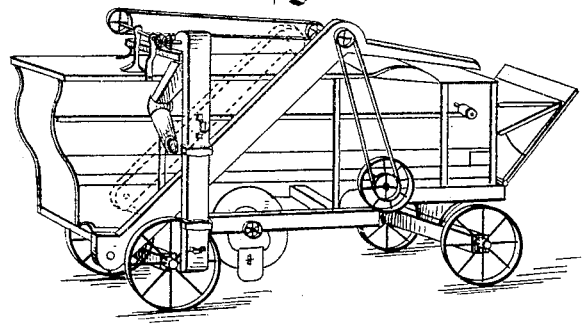
Figure 2:
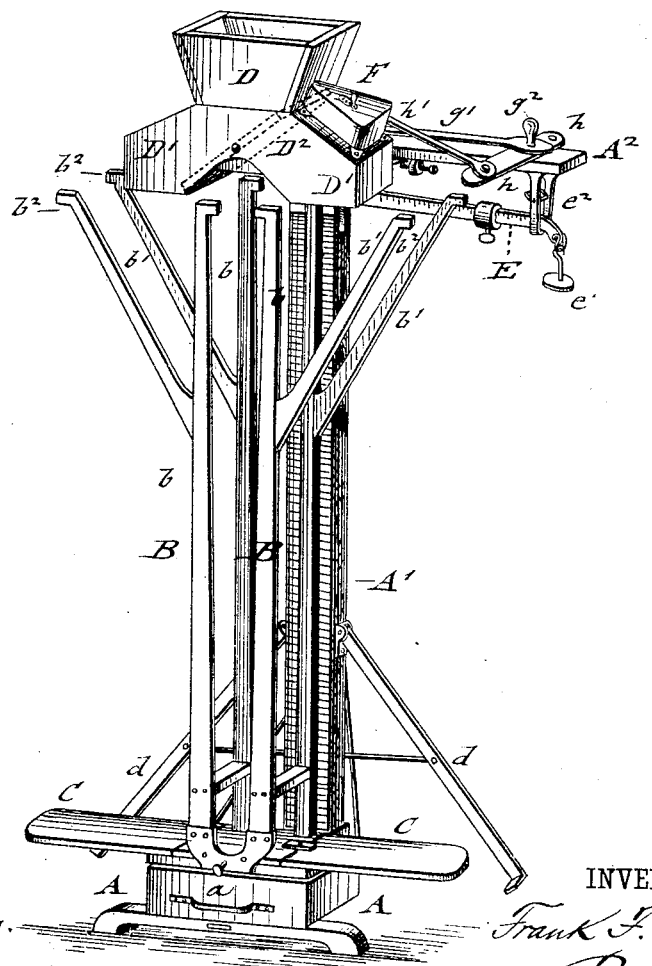

In the accompanying drawings, Figure 1 represents a thrashing machine with an auxiliary elevator-leg, whereby the thrashed grain is raised for being conveyed to my improved weighing apparatus. Figs. 2 and 3 are respectively perspective views from opposite sides of my improved weighing apparatus, and Figs. 4, 5, 6, 7, and 8 are details of the same.

Similar letters of reference indicate the corresponding parts.

In the drawings, A represents a weighing-scale of any approved construction, to the platform of which is applied a double bag-holder, B B, by means of clamp-screws $a$ $a$. Each bag-holder B consists of two upright strips, $b$, to the upper parts of which the inclined arms $b'$ are applied. The ends of the upright and inclined strips of each bag-holder are provided with horizontal lugs $b^2$, which extend in opposite direction to each other, as shown clearly in Figs. 2 and 3. The bag is applied to and supported on the ends $b^2$ of the strips $b$ $b'$. The bottom of the bag rests upon a hinged board, C, which is applied to the platform of the scale in such a manner that it can be thrown up, as shown in Fig. 3, when the apparatus is not in use.

The weighing-scale A is provided with an upright standard or arm, A', to the lower part of which are applied the hinged braces $d$, which may be thrown up and retained alongside of the standard A' by pivoted arms $d'$, as shown in Fig. 3. When the braces $d$ are lowered to the ground the pivot-arms $d'$ are secured to perforated straps $d^2$ of the standard A', so as to impart a greater degree of steadiness to the entire weighing apparatus when the same is in use. The standard A' of the scale A is provided at its upper end with a horizontal arm, $A^2$, to which is secured a grain-conducting hopper, D, having two sidewise-inclined discharge-channels, D', which extend symmetrically to the axis of the hopper to points above the middle parts of the bag-holders. The hopper D is provided with a centrally-pivoted valve, $D^2$, which is adapted to be oscillated by suitable mechanism, hereinafter to be described, to either side of the axis of the hopper, so as to shed the grain to be measured through one discharge-channel or the other into one of the bags supported on the double bag-holder.

Below the arm $A^2$ is arranged the graduated beam E of the scale A, which beam is provided in the usual manner with a sliding weight, $e$, and with regulating end weight, $e'$. The beam E is fulcrumed to the upright standard A', and connected in the usual manner by a rod with the platform of the scale. The outer end of the beam is guided and stopped by a stirrup, $e^2$. A lever, $f$, is pivoted to the end of the beam E, near the fulcrum of the same, and to a fixed staple, $f'$, at the under side of the arm $A^2$, as shown clearly in detail in Fig. 4, the lever $f$ being provided with an upwardly-projecting catch, $f^2$, which passes through a slot of the arm $A^2$, and which engages a slide-piece, $f^3$, that is guided between parallel straps $f^4$, applied to the upper part of arm $A^2$, as shown clearly in Fig. 6.

To the slide-piece $f^3$ is connected a finger, $f^5$, that is pivoted at its upper end to a short recessed upright, $A^3$, of the standard $A'$, said finger being applied at its middle part to an actuating band-spring, $g$, that is connected at its opposite end to the recessed upright $A^3$. The finger $f^5$ is furthermore connected by a universal joint, $f^6$, (shown in detail in Fig. 7,) with a rod, $g'$, having a handle, $g^2$, whereby the actuating-spring $g$ and the slide-piece $f^3$ are set, so as to engage the catch $f^2$ of the lever $f$, applied to the beam of the scale A. The setting-rod $g'$ is adapted to be connected by a pin of its handle $g^2$ with a lever, $h$, which is fulcrumed to the outer end of the arm $A^2$, and provided at both sides and equidistantly from its fulcrum with pin-holes for the handle $g^2$, as shown clearly in Fig. 5. The longer end of the fulcrumed lever $h$ is connected by a pivot-rod, $h'$, with a crank-arm, $h^2$, that is keyed to the outer end of the pivot of the oscillating valve $D^2$. The connecting-rod $h'$ engages also, by a catch, $h^3$, the projecting end of a lever-rod, $h^4$, of a suitable registering device, F, which is applied to the top of one of the discharge-channels $D'$ of the hopper D, and shown in detail in Fig. 8. The register F may be of any approved construction, and serves for the purpose of keeping an accurate count of the number of bags filled and weighed on the apparatus.

The grain is conducted to the weighing apparatus and weighed in the following manner: It is taken up by an auxiliary elevator-leg, that is applied to a pivoted supporting-strap alongside the usual inclined elevator of the thrashing-machine, as shown in Fig. 1, the buckets being set in motion by a suitable belt and pulley and bevel-wheel transmission, so that the grain is lifted in the auxiliary elevator-leg to the proper height and conveyed by a spout to the hopper of the weighing apparatus, which may be arranged at either side of the thrashing-machine, as most convenient. From the hopper the grain passes along the inclined valve $D^2$ and one of the discharge-channels $D'$ into one of the bags supported by the double bag-holder until the proper weight of grain—say one and one-half bushel or two bushels—is obtained in the bag, which causes the platform of the scale with the bag to be lowered, so as to raise thereby the beam of the scale and simultaneously lower the pivot-lever $f$, that connects the beam with the slide-piece and valve-actuating mechanism. The catch of the lever is thereby released from the slide-piece, so that the spring draws it back along its guide-straps to the opposite end of the same. The spring $g$ carries thereby the connecting-rod $g'$ along and operates by the fulcrumed lever $h$ and the connecting crank-rod $h'$ and crank $h^2$ the discharge-valve $D^2$, so as to tilt the same to the opposite discharge-channel and cause the grain to pass into the bag suspended from the second bag-holder. The first bag is now removed and replaced by an empty bag while the process of filling the second bag is going on. The attendant has now to reset the actuating-spring $g$ of the valve $D^2$, which is accomplished by removing the handle of the connecting-rod $g'$ from the fulcrumed lever $h$, pulling the slide-piece forward as far as the guide-straps will allow, and then placing the handle of the connecting-rod into the pin-hole of the fulcrumed lever at the other side of the fulcrum. When the handle-rod is connected with the outer end of the fulcrumed lever the valve is in the position shown in dotted lines in Fig. 3, and is then retained in this position by the catch of the connecting-lever. As soon as the bag is filled and weighed the catch is released from the slide-piece, and the valve is tilted over to the other side of the hopper D, after which the actuating-spring is set again and the handle-rod applied to the inner pin-hole of the fulcrumed lever, as shown in full lines in Fig. 5, in which position the actuating mechanism of the valve is ready to return the same into the first position at the moment when the second bag has received its proper weight of grain.

All the attendant has to do is to remove the filled bags and replace them by empty bags, and to reset the valve-actuating mechanism whenever a filled bag has been removed. One man can thus readily fill about two hundred bags in an hour without the loss of time and spilling of grain that are incidental in filling bags by the old method, as thereby for bags containing one and one-half bushel the separate measuring of the half-bushels is required.

The apparatus may also be used for measuring two-bushel bags, if such are desired. It may also with advantage be used by farmers in connection with a grain-cleaning machine, in which case an auxiliary elevator-leg similar to that shown in Fig. 1, as applied to the thrashing-machine is used with the cleaner, whereby each farmer is enabled to weigh his grain at the same time when it is filled into the bags. The auxiliary elevator-leg is arranged in such a manner in connection with the thrasher or cleaner that it can be folded up alongside of the inclined elevator, as shown in dotted lines in Fig. 1, which is necessary when the thrasher has to be removed from one farm to the other.

I do not lay any claim to the auxiliary elevator whereby the grain is raised to the proper height for being conveyed to the weighing apparatus, but reserve the right to file a separate application for Letters Patent for the same.

Having thus described my invention, I claim as new and desire to secure by Letters Patent—

1. The combination of scale-beam E, tension-lever $f$, having catch $f^2$, guided slide-piece $f^4$, oscillating finger $f^5$, actuating-spring $g$, connecting-rod $g'$, having handle $g^2$, fulcrumed lever $h$, connecting-rod $h'$, crank-arm $h^2$, and oscillating valve $D^2$ of grain-conducting hopper D $D'$, substantially as described.

2. The combination of scale-beam E, tension-lever $f$, having catch $f^2$, guided slide-piece $f^4$, oscillating finger $f^5$, actuating-spring $g$, handle-rod $g'$ $g^2$, fulcrumed lever $h$, connecting-rod $h'$, having catch $h^3$, and lever-rod $h^4$ of registering device F, substantially as set forth.

In testimony that I claim the foregoing as my invention I have signed my name in presence of two subscribing witnesses.

FRANK F. NEITZEL.

Witnesses:
CHAS. KORTH,
CHAS. O'CONNOR.